United States Patent
Klemenz

(10) Patent No.: US 9,530,115 B2
(45) Date of Patent: Dec. 27, 2016

(54) MESSAGE EVALUATION TOOL

(71) Applicant: Oliver Klemenz, Hoffenheim (DE)

(72) Inventor: Oliver Klemenz, Hoffenheim (DE)

(73) Assignee: SAP SE, Walldorf (DE)

( * ) Notice: Subject to any disclaimer, the term of this patent is extended or adjusted under 35 U.S.C. 154(b) by 80 days.

(21) Appl. No.: 13/735,971

(22) Filed: Jan. 7, 2013

(65) Prior Publication Data

US 2014/0195541 A1    Jul. 10, 2014

(51) Int. Cl.
*G06Q 10/10* (2012.01)
*G06F 11/30* (2006.01)

(52) U.S. Cl.
CPC ........... *G06Q 10/10* (2013.01); *G06F 11/3086* (2013.01)

(58) Field of Classification Search
CPC .............. G06F 17/30864; G06F 17/30321; G06F 17/30867; G06F 17/30595
USPC ........................................ 707/741, 748, 752
See application file for complete search history.

(56) References Cited

U.S. PATENT DOCUMENTS

| | | | |
|---|---|---|---|
| 6,226,787 B1 | 5/2001 | Serra et al. | |
| 7,698,398 B1 | 4/2010 | Lai | |
| 7,962,903 B1 | 6/2011 | Ross | |
| 8,051,428 B2 * | 11/2011 | Hofmann | G06F 9/542 709/230 |
| 8,086,726 B2 * | 12/2011 | Hofmann | 709/224 |
| 8,429,597 B2 | 4/2013 | Prigge | |
| 2004/0103071 A1 | 5/2004 | Kalia et al. | |
| 2006/0020678 A1 * | 1/2006 | Kessler et al. | 709/207 |
| 2006/0074732 A1 | 4/2006 | Shukla et al. | |
| 2006/0074736 A1 | 4/2006 | Shukla et al. | |
| 2006/0129974 A1 | 6/2006 | Brendle et al. | |
| 2006/0195460 A1 * | 8/2006 | Nori et al. | 707/100 |
| 2007/0011178 A1 | 1/2007 | Dumitru et al. | |
| 2007/0157096 A1 | 7/2007 | Keren et al. | |
| 2008/0082959 A1 | 4/2008 | Fowler | |
| 2009/0083297 A1 | 3/2009 | Pohl et al. | |
| 2009/0313283 A1 | 12/2009 | Conradi | |
| 2010/0001834 A1 * | 1/2010 | Brunswig | G06Q 10/06 340/7.51 |
| 2011/0252023 A1 * | 10/2011 | Santamaria et al. | 707/723 |
| 2012/0158416 A1 | 6/2012 | Brunswig et al. | |
| 2013/0111277 A1 | 5/2013 | Klemenz et al. | |
| 2013/0159035 A1 * | 6/2013 | Brunswig et al. | 705/7.11 |

OTHER PUBLICATIONS

VNSG PI Task Group, "Process Integration Monitoring", version 1.0, May 8, 2009, pp. 1-58.*

* cited by examiner

*Primary Examiner* — Rehana Perveen
*Assistant Examiner* — Loc Tran
(74) *Attorney, Agent, or Firm* — Mintz Levin Cohn Ferris Glovsky and Popeo, P.C.

(57) ABSTRACT

In one aspect, there is provided a method. The method may include configuring, at a message evaluator, one or more factors to enable monitoring of a plurality of messages exchanged between a sending object and a receiving object, the one or more factors including a key generated based on a plurality of attributes obtained by accessing at least one of the sending object or the receiving object, the plurality of attributes representing data fields in at least one of the sending object or the receiving object; selecting, by the message evaluator, at least one of the plurality of messages, when at least one of a match or a substantial match exists between the generated key and a portion of the at least one of the plurality of messages; and presenting, by the message evaluator, the selected at least one of the plurality of message.

20 Claims, 6 Drawing Sheets

Class Interface: CL_APPR0_XIME_LEX_SCC    Implemented / Active

Properties | Interfaces | Friends | Attributes | Methods | Events | Types | Aliases ☐ Parameter | ⚠ Exception | ... | ☐ Filter

| Method | Level | Visibility | M. | Description |
|---|---|---|---|---|
| SHOW_BO | Instance Method | Public | | Show Business Objects in BO Test Shell |
| SHOW_DOC | Static Method | Public | | Show Documentation |
| FETCH_DEFAULTS | Instance Method | Public | | Get Program Defaults |
| SHOW_RESULT_TABLE | Instance Method | Public | | Show Result Table |
| SHOW_SELECTED_MSG | Instance Method | Public | | Show Selected Message in SQL Monitor |
| SPROXY_BOS | Instance Method | Public | | Show BOs in SPROXY |
| SPROXY_SELECTED_MSG | Instance Method | Public | | Show Selected Message in SPROXY |
| START | Instance Method | Public | | Start xI Message Choreography Evaluation |
| DOWNLOAD_DFF_EXPR | Static Method | Public | | Download Default Expression As ABAP coding |
| READ_CELL | Instance Method | Protected | | Read Cell Value |
| GET_PARAMETER | Instance Method | Protected | | Read Parameter Value |
| NAVIGATE_BO_PATH | Instance Method | Protected | | Navigate a BO Path |
| GET_VALUE_CALLBACK | Instance Method | Protected | | Get Value Callback |
| GET_SEQUENCE_CONTEXT | Instance Method | Protected | | Get Sequence Context |
| GET_PROGRAM_DEFAULTS | Instance Method | Protected | | Get Program Defaults |
| GET_FUZZY_SEARCH | Instance Method | Protected | | Get Fuzzy Search |
| GET_DEFAULT_EVAL_EXPR | Instance Method | Protected | | Get Default Evaluation Expression |
| GET_BO_ROOT_NODE_ID | Instance Method | Protected | | Get BO Root Node Id |
| FIND_LAST_EQUAL | Instance Method | Protected | | Find Last Line Value with equal Column Values |
| WRITE_PARAMETER | Instance Method | Protected | | Write Parameter value |
| WRITE_CELL | Instance Method | Protected | | Write Cell Value |
| CONSTRUCTOR | Instance Method | Public | 🔧 | CONSTRUCTOR |

FIG. 5

MESSAGE EVALUATION TOOL

TECHNICAL FIELD

The subject matter described herein relates generally to data processing.

BACKGROUND

The inherent complexity of business scenarios, which may include one or more business processes, and their implementation in business software solutions, enterprise resource planning (ERP) systems, and the like may present substantial challenges to users and may be a serious obstacle to widespread operative use of process and scenario models in the software landscape. Indeed, these complex business processes may include dozens, if not hundreds or more, steps, making it difficult for the end-user and the enterprise to manage. As such, business systems often include complex messaging schemes, which may be based on protocols, such as the extensible markup language (XML) and the like.

SUMMARY

In one aspect, there is provided a method. The method may include configuring, at a message evaluator, one or more factors to enable monitoring of a plurality of messages exchanged between a sending object and a receiving object, the one or more factors including a key generated based on a plurality of attributes obtained by accessing at least one of the sending object or the receiving object, the plurality of attributes representing data fields in at least one of the sending object or the receiving object; selecting, by the message evaluator, at least one of the plurality of messages, when at least one of a match or a substantial match exists between the generated key and a portion of the at least one of the plurality of messages; and presenting, by the message evaluator, the selected at least one of the plurality of message.

In some variations, one or more of the features disclosed herein including the following features can optionally be included in any feasible combination. The plurality of messages may include messages configured in accordance with an extensible mark-up language. The accessed at least one of the sending object or the receiving object may include a business object including a root node linked to the plurality of attributes comprising the data fields. The key may be generated by at least concatenating the plurality of attributes. The one or more factors may further include an evaluation expression, a message status, an identifier representative of at least one of a transaction or a document associated with at least one of the sending object or the receiving object. The method may further include receiving, from a user interface, the one or more factors selected via the user interface. The substantial match may further include performing a fuzzy search to identify, based on at least a date, a time, and the generated key, the at least one of the plurality of messages, the fuzzy search configured to return the at least one of the plurality of messages matching the date, the time, and a portion of the generated key.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 5 depicts a table of some methods, which may be accessed or inherited by the message evaluator, in accordance with some example implementations.

When practical, similar reference numbers denote similar structures, features, or elements.

DETAILED DESCRIPTION

The subject matter disclosed herein relates to a message evaluation tool configured to evaluate messages, such as extensible markup language messages. Although some of the examples described herein refer to XML messages, other types of messages, such as JavaScript Object Notation (JSON) and other text-based, human-readable data interchange formats may be used as well.

This message evaluation tool may be used to assist identifying inconsistencies in message exchanges between objects, such as business objects. The communications between these objects may represent a communication that is a combination of one or more individual messages, such as XML messages and the like, sent in a certain sequence, or choreography. In some instances, the XML message choreography may be very complex and include relatively large payloads, while in some other instances, one or more XML messages may be received out of sequence.

In some example implementations, the subject matter disclosed herein may provide an XML message evaluator that may use a business semantic to select for viewing an XML message from a communication choreography between systems including, for example, business objects. For example, using rules in accordance with a textual language, such as XML or other human-readable, text-based languages, the XML message evaluator may be used to define, which XML message or portion of the XML message is selected for presentation to a user via the XML message evaluator. Moreover, the definition may take into account the specific business semantics associated with the underlying business objects sending the XML messages, and the message evaluator may access the business objects to determine attributes that can be used as the semantics.

In some example implementations, the XML message evaluator may also provide via a user interface a graphical representation of one or more selected XML messages. As such, a user may obtain an overview of what happened in the communication choreography between business objects. The selection of a message or a portion of the message (e.g., a data portion) may be configured at a user interface of the XML message evaluator, giving the user of the XML message evaluator the ability to isolate issues and inconsistencies for analysis. The XML message evaluator may also apply calculation rules to highlight specific situations for analysis and/or viewing.

Although some of the example implementations disclosed herein refer to the XML message evaluator monitoring XML message communications between business objects, other types of objects and messages may be evaluated as well.

Figure 1:
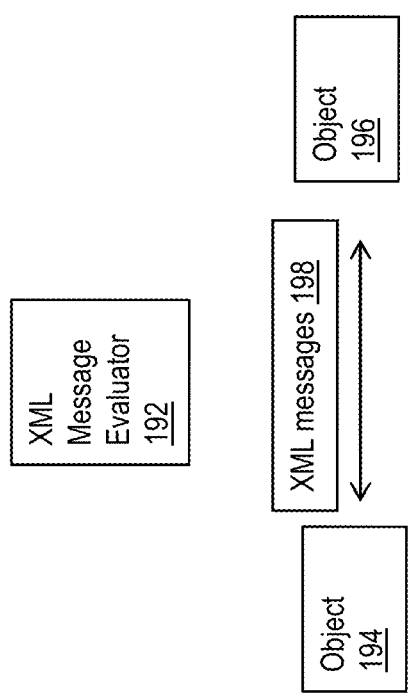
FIG. 1 depicts an example of a system, in accordance with some example implementations.

FIG. 1 depicts an example of a system including an XML message evaluator 192, a first object 194, a second object 196, and one or more XML messages 198, all of which may be coupled by a transport mechanism, such as a network. In some example embodiments, the XML message evaluator 192 may include a user interface and logic for monitoring and/or selecting one or more XML messages 198. The selected messages may then be presented at a user interface of the XML message evaluator 192. The objects 194 and 196 may be implemented as business objects, although other types of objects and data structures may be used as well. Moreover, in some example implementations, the first object 194 is included in a first component (also referred to as a deployable unit) of a business system, and the second object 196 is included in a second component of a business system. In the example of FIG. 1, the XML message evaluator 192 may be configured to select one or more XML messages to enable identification and analysis of issues, such as faults, inconsistencies, or otherwise analyze the communication sequence/choreography and/or payload of the XML messages.

Figure 2:
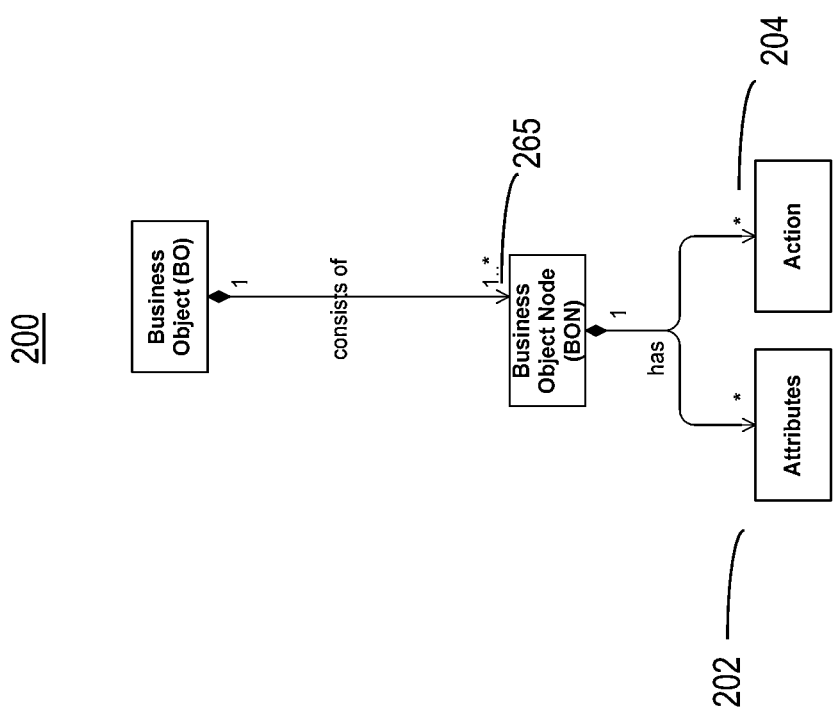
FIG. 2 depicts an example of a business object, in accordance with some example implementations.

Before providing additional details regarding the XML message evaluator, the following provides a description of an object, such as a business object. FIG. 2 depicts an example of a business object. The business object (BO) 200 may comprise a root node 265, data content (e.g., attributes) 202, and processes (e.g., actions) 204. The business object 200 may be used to structure an object in terms of a real world business task. For example, a business object may comprise an object including data and processes for a sales order, and another business object may include data and processes for a purchase order, and so forth. The metadata of business object 200 may include one or more of fields, nodes, queries, associations, actions, and business logic, and the metadata may be stored in a repository, such as a metadata repository (MDRS).

Referring again to FIG. 1, to enable identification and analysis, the XML message evaluator 192 may select XML messages for evaluation based on an identifier, such as a business transaction document identifier (BTD Id). This business transaction document identifier may be implemented as a text-based, human readable identifier that identifies a business document or transaction, such as a document/transaction related to the processing of a sales order and the like. As such, the business transaction document identifier has a business semantic, and this business semantic may be converted to an identifier of an underlying business object, such as the root node identifier of the business object, providing the information for the business transaction or document (e.g., a document associated with the transaction). When the XML message evaluator 192 selects messages based on the business transaction document identifier, the selection may be done within the context of a business semantic, which provides a higher-layer, business semantic of the XML communication between business objects. Specifically, the XML message evaluator monitors the messages based on the business semantic associated with the business transaction or business object.

The XML message evaluator 192 may select XML messages for evaluation based on a sequence context code (also referred to as a sequence context key). The sequence context code, or key, represents a unique identifier based on attributes (e.g., fields, data, parameters, and the like) from the business object itself. For example, the sequence context code may be formed as a combination of a material identifier, a managed location identifier, and a supply planning area identifier obtained from a purchase order business object. By using the business semantic, the business object in the sequence context code, the XML message evaluator may select very specific XML messages exchanged between business objects.

The XML message evaluator 192 may select XML messages for evaluation based on a fuzzy search. The fuzzy search refers to an error-tolerant search. For example, the search may return results despite mistakes in the search terms and/or return results that are similar to, but perhaps not identical to, the search terms used to initiate the search. In some example implementations, XML message evaluator 192 may perform a fuzzy search of all messages from a sending business object and a receiving business object, such as business objects 194 and 196, and this fuzzy search may have terms, such as a specific date and time range and a path in the XML message payload identifying a specific value, such as a business transaction document identifier (BTD Id), in the XML message. In this example, the fuzzy search would return those XML messages within the date and time range that substantially match a specific value, such as the business transaction document identifier.

Figure 3:
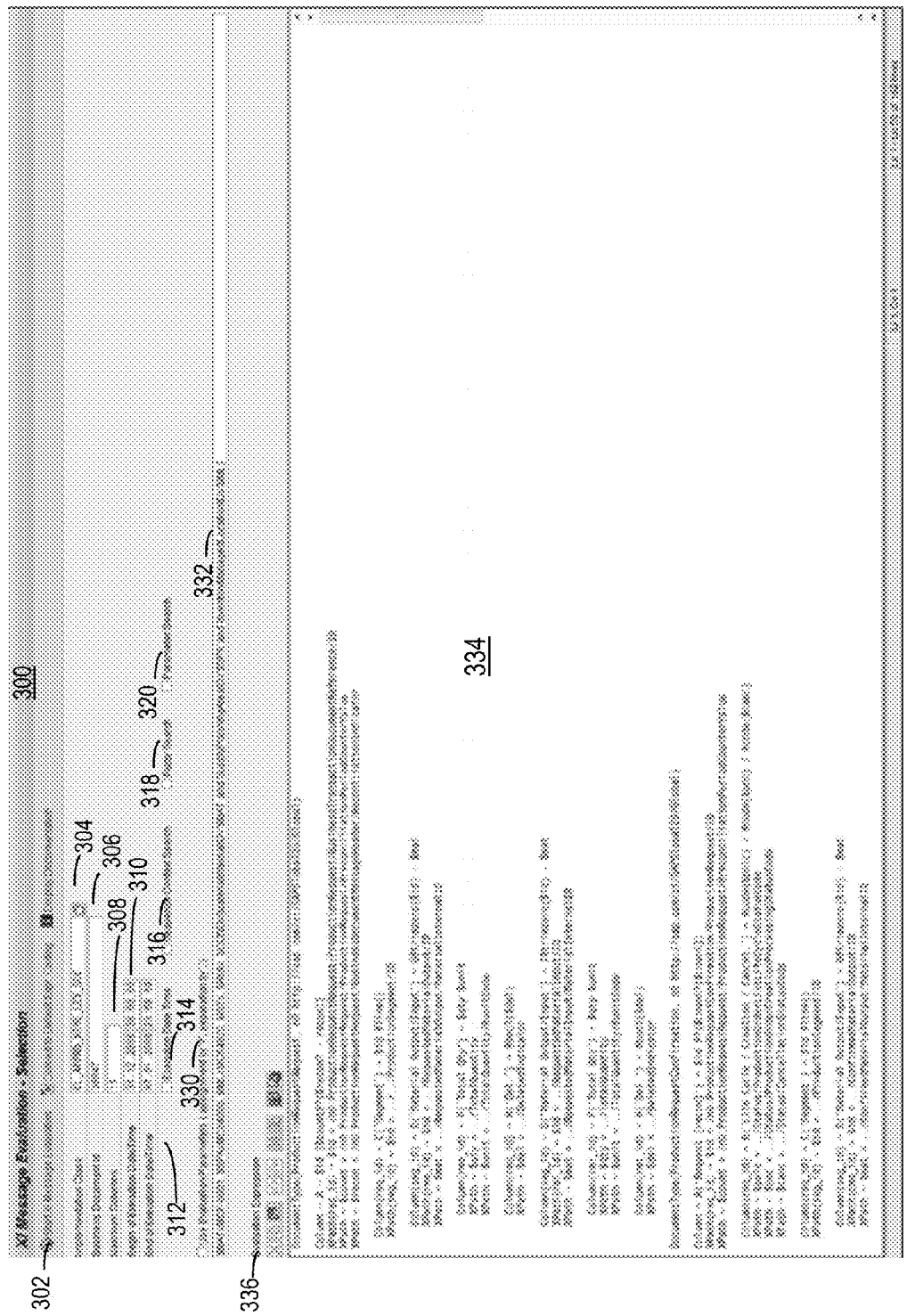
FIG. 3 depicts an example of a user interface of a message evaluator, in accordance with some example implementations.

FIG. 3 depicts an example user interface 300 configured to allow message selection based on business semantics. User interface 300 may include a start button 302 (e.g., "Start XML Message Evaluation") in order to initiate XML message evaluation, although other mechanisms (e.g., a function key, such as F8, and the like) may be used as well.

To begin the message selection and evaluation, an implementation class may be selected at 304 and the XML message evaluator may be configured. The implementation class 304 represents a parameter implementation class defining a project-specific implementation, such as specific business systems including business objects. The selection of the implementation class 304 may define one or more other fields on user interface 300. For example, an implementation class 304 selection may cause one or more predetermined values for the user interface 300 to be automatically inserted into one or more user interface elements 306-332. These predetermined values may be configured to allow a user of user interface 300 to perform the evaluation without additional configuration at 306-332.

The business document identifier (also referred to herein as the business transaction document identifier) 306 may be provided at user interface 300 to define the specific business object instances serving as an entry point for evaluating XML messages 198. The business document identifier 306 may be mapped to a business object root node identifier of the business object 194 or 196 that is the source or the destination for XML messages 198. This mapping may be done by a query to the business objects 194 and 196 or a function to convert the business document identifier to the business object node identifier.

The XML message evaluator 192 may allow configuration of the columns containing the XML messages selected for presentation. For example, the maximum columns 308 may be provided at user interface 300 to define the number of columns used to present appearance the results user interface, an example of which is described with respect to FIG. 4. These results may be displayed in a spreadsheet-like table having a certain number of columns, such as 'A', 'B', and so forth. With the maximum columns 308 parameter, the number of columns may be controlled to allow the display of just the columns that are needed to evaluate the XML messages 198 selected for presentation and analysis.

The begin of execution date/time 310 and the end of execution date/time 312 may be provided via user interface 300. The begin of execution date/time 310 represents when a business object starts the XML message communication, and the end of execution date/time 312 represents when a business object ends the XML message communication. The begin of execution date/time 310 and the end of execution date/time 312 may serve as a filter of the XML messages 198. For example, begin and end times 310 and 312 may be used to filter messages, so that XML message evaluator 192 only selects messages within the begin and end times 310 and 312. To further illustrate, if a certain error in the XML messaging begins after a certain date and time, that certain data and time may be entered at begin of execution date/time 310 to filter XML messages 198 occurring after the error. In some implementations, XML message evaluator 192 may implement filtering based on the begin of execution date/time 310 and the end of execution date/time 312, when selected at 314 (e.g., checking the field activates the filtering, and un-checking deactivates the filtering).

In some implementations, XML message evaluator 192 may use the sequence context code noted above to perform a sequence context search 316 of the XML messages 198. XML messages 198 may be sequenced based on an identifier, such as the business object root node identifier of the sending/receiving business object. However, in more complex transactions, the business object root node identifier may not be sufficient, so the sequence context code (also referred to as a context key or key) may be used to select XML messages 198. For example, a sequence context code may be generated specific to a transaction, project implementation, and/or business object. To illustrate further, a sequence context code may be formed as a combination of identifiers for attributes, such as material (MAT), supply planning area (SPA), inventory managed location (IML), identified stock (IST), and/or restricted use indicator (RUI), of business object 194 and/or 196. This formed sequence context code may then be provided as an evaluation parameter at, for example, 332 (see, e.g., MAT="MCF-0001," SPA="MC64920" and so forth). And, the formed sequence context code (which represents the business semantics of the business objects) may be used to select one or more XML messages 198 for evaluation by XML message evaluator 192.

In some implementations, XML message evaluator 192 may allow selection of a fuzzy search 318. For example, a user may check the check box at 318 and enter fuzzy search parameters as evaluation parameters at 332 and select evaluate expression at 336 to begin the fuzzy search of XML messages 198. Next, the XML message evaluator 192 may initiate a fuzzy search of the XML messages 198 (and/or business objects 194 and 196) based on a specific date and time range and a path in the XML message payload identifying a specific value, such as a business transaction document identifier (BTD Id). In this example, the fuzzy search would return XML messages within the date and time range that substantially match the specific value, such as the BTD Id. Those messaging satisfying the search may then be selected for presentation as a result at the XML message evaluator 192 (e.g., at user interface 400).

A fuzzy search 318 may be used when there is a certain state of the business process (e.g., a business object instance no longer exist), but an analysis of the XML messages 198 is still required. When this is the case, it may not be possible to find XML messages using the business document identifier because a mapping from business document identifier to the business object root node identifier cannot be provided from a repository, database, or a directory (e.g., a process integration persistency (PIP)), which corresponds to a directory of sent messages. Fuzzy search may also be used when messages are not successfully processed at the inbound and, as a consequence, the business object root node identifier of the receiving business object cannot be determined (which may not exist in case the XML messages were not processed successfully). In both cases, there is a mismatch in the number of sending business object instances and the number of receiving business object instances. The fuzzy search 318 may be defined to support the above-mentioned use cases by searching for XML messages by directly looking into the payload and identifying the correct XML messages by comparing the business transaction document identifier for business data.

In some implementations, XML message evaluator 192 may allow selection of a parameter search 320 at user interface 300. The parameter search 320 may be entered as an evaluation expression at 332. The parameter search 320 may be used when there is a complex mapping from evaluation parameters to the business object root node identifier of the sending/receiving business object, rather than use a complex sequence context. For example, a query may be executed on a confirmation object with a parameter material identifier and navigation to the sending/receiving business objects may use a retrieve-by-association command available as an action at a business object. Selection criteria of messages can be based on the message content, and this content may have a special semantic. To identify messages having this semantic, the message content can be evaluated. The context may include a sequence context describing a combination of data in the message content, which specifies if the message belongs to a message choreography or to another choreography.

The XML message evaluator 192 may also be configured to filter by message status. For example, messages may be filtered according to their message status, such as all messages, processed successfully, scheduled, error occurred, not processed, and the like. These filter values may be defined as evaluation expression at 332.

The XML message evaluator 192 may also be configured to allow defining evaluation parameters by entering an evaluation expression at 332. For example, an evaluation expression may be defined at 332 using a script-based language editor, a text-editor, and/or a tool that guides a user through the formation of the evaluation expression used to select XML messages 198 based on a business semantic.

The XML message evaluator 192 may also include a window 334. Window 334 captures the fields, such as 304, 306, 310, 312, 332, and the like, and forms the expressions shown therein to control how the data of the selected messages are retrieved, transformed and presented to the user in, for example, results user interface 400 (e.g., how the spreadsheet-like rows and columns are filled with the data from the messages). For example, an evaluation based on the expressions at 334 may be performed on the XML messages 198. The evaluation expressions 334 may define a document type, a column, and a path, as noted further below with respect to Table 1. The document type defines which payload fields of an XML message 198 are relevant for the result; the column statement defines how the result is configured in a column of the result; the XPath statement defines how to read or write the XML messages 198.

segment 422, material output 424, action 426, total quantity 428, fulfillment quantity 430, and the like. Data 412-432 is an example of test data based on a business object production request. It is extracted data from a plurality of messages marked with an indicator, such as curly brackets on the left. Each line maps to XML content in the message. The header of each column identifies the extracted XML content in the messages. The selected XML messages at 414A and so forth may be listed with a flag representative of the processing status of the message. The first column shows a flag, which graphically represents the processing status, such as processed, scheduled, error, not processed, and the like.

The XML message evaluator 192 may, as noted, provide a monitor. In some example implementations, selecting (e.g., double clicking) on the status 412 or the message identifier 414 for a given message (e.g., represented by one or more rows, such as metadata for message 490A, 490B, and the like) causes an XML monitor to launch and thus provide a view of the message, although selecting icon 442 may also launch the XML Monitor. The XML monitor providing a list of all messages in a system. The messages may be sorted after a given execution date, but the listing may not make visible any dependency or choreography information. For example, the XML monitor may be used to check the execution status of a single message, to determine whether a message has been sent, and the like.

In some implementations, in order to enable XML message evaluator 192, the underlying business system including business object 194-196 may include the XML message evaluator 192. For example, a business system(s) including objects 192 and 196 may create a class to allow messages to be monitored by XML message evaluator 192. Moreover,

TABLE 1

| Element | Description | Syntax | Example |
| --- | --- | --- | --- |
| DocumentType | Document Type for which the following Evaluation Expressions are valid | DocumentType(<Name>,<NameSpace (-> <InheritName>)) | DocumentTypeProductionRequestRequest, n0 http.//sap.com/xi/SAP |
| Column | Column in the result table including the expression how this column is filed | Column(((<ColumnId>)-(->)-(<XPathId>))) (~<ColumnName>(('<Header>')) - <Expression> ) | Column(myXPathID) - A - $id |
| XPath | XPath expression defining now to read out the XML message payload into a variable | XPath((XPathId)) - <Variable> = <XPathExpression> | XPath(myOtherXPathID) - $id = /n0:ProductionRequestRequest/ ProductionRequestBusinessTransaction |

Figure 4:
FIG. 4 depicts an example of another user interface of a message evaluator, in accordance with some example implementations.

FIG. 4 depicts an example of a user interface 400 presenting results of the XML message evaluator 192. The results include a result table 410 having, in the example depicted, four columns: status 412, execution date/time, message identifier 414A, document type 416, and one or more other columns, such as request 418, life cycle 420, the created class may be configured to inherit from the business objects or underlying business system. Specifically, XML message evaluator 192 may inherit methods, such as get root business object node, get fuzzy search, navigate to a business object, and the like. As such, the XML message evaluator may access and use the methods available at the business object by calling those methods. Table 2 and FIG.

5 depict examples of some of the methods, which may be inherited by XML message evaluator 192 in order to select messages for evaluation.

to support nesting of these functions. And, these functions starts may be delineated with a symbol, such as a "@" followed by the function name.

TABLE 2

| Method Name | Description | Redefinable |
|---|---|---|
| GET_BO_ROOT_NODE_ID | Get BO Root Node ids of the sending/receiving Business Object | yes |
| GET_DEFAULT_EVAL_EXPR | Define the default Evaluation Expression for first selection screen display | yes |
| GET_FUZZY_SEARCH | Define the Fuzzy Search logic | yes |
| GET_PROGRAM_DEFAULTS | Define program parameters for first selection screen display | yes |
| GET_SEQUENCE_CONTENT | Define your project specific Sequence Context it applicable | yes |
| GET_VALUE_CALLBACK | Define a more complex Column content on basis of the previous evaluations | yes |
| FIND_LAST_EQUAL | Find Last Line Value with equal Column Values | no |
| NAVIGATE_BO_PATH | Navigate from a Business Object via a Path, Syntax: <BO></Node> -> <ASSOCIATION1>/<ASSOCIATION2>/ . . . | no |
| READ_CELL | Read a cell value from the currently filled Result table buffer (e.g. can be used in GET_VALUE_CALLBACK) | no |
| READ_PARAMETER | Read a parameter defined in the Selection Screen | no |
| WRITE_CELL | Write a cell value into the currently filled Result table buffer (e.g. can be used in GET_VALUE_CALLBACK) | no |
| WRITE_PARAMETER | Write a parameter value | no |

Some of the methods of Table 2 may be re-definable (labeled yes at Table 2) by the XML message evaluator 192. Re-definable (also referred to as re-definition or overwriting) refers to defining a new class inheriting from a base class, overwriting methods with the new implementation. Another way of customizing the message evaluation process is implementation in a native programming language For example, if the expressions language in window 334 is not sufficient to select the desired message (or the selection criteria is burdensome (requiring a fuzzy logic selection), then an implementation in the "host" programming language of the message evaluator tool can be performed.

In some implementations, a value callback may be implemented by redefining the method GET_VALUE_CALLBACK. This method can be used to interface the automatic data retrieval from the XML message, and additional transformations or other steps can be performed before the data is presented on the user interface 400. The method GET_VALUE_CALLBACK at Table 2 may be called from the XML message evaluator 192, when rendering a cell in the results user interface 400 using the column and row information. The call may be made for every XPath expression result node or for every column expression before evaluating a function in the evaluation expression 332 and writing the cell value into the result user interface 400. In any case, the information row, column, document type, node name, attribute name, and/or the current value may be passed to the GET_VALUE_CALLBACK method in order to allow the correct identification. The value may either be preset with the value of the XPath expression result node value or with the column expression content already having the variable occurrences replaced by the XPath result. In the first case, the XPath identifier and the XPath variable may be passed to enable switching implementation logic regarding how to change the value. In the second case, the expression identifier (if defined at 332) is passed. The value is a changing parameter that may be directly manipulated. The value callback may also be called in recursive expression evaluations 332 and/or 334.

Figure 6:
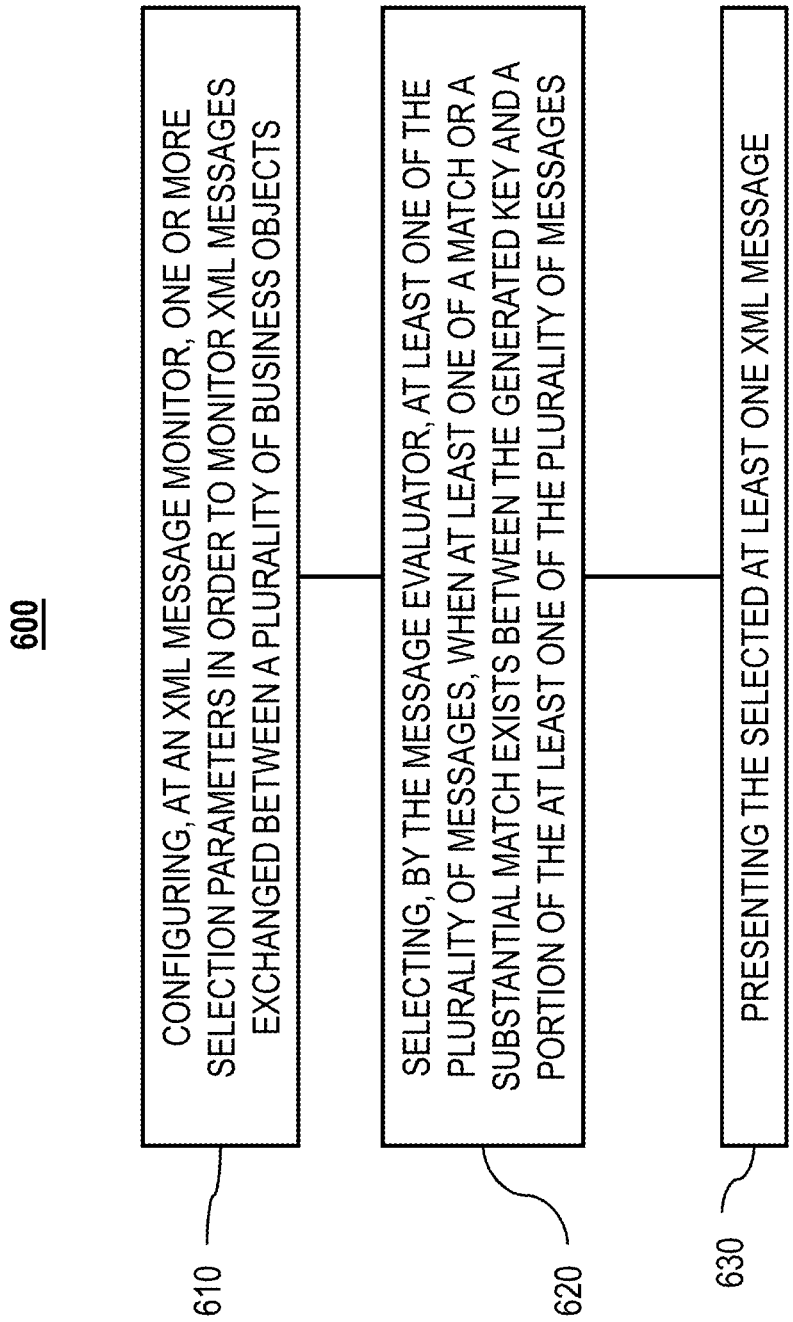
FIG. 6 depicts an example of a process, in accordance with some example implementations.

The XML message evaluator 192 may also be configured to support functions, such as inverse, Boolean, average, count, AND, OR, XOR, and the like, at expression evaluations 332 and/or 334, and these functions may be configured FIG. 6 depicts an example process 600 for evaluating XML messages in accordance with some example implementations.

At 610, the XML message evaluator 192 may be configured with one or more factors in order to monitor and select XML messages exchanged between objects, such as business objects. For example, one or more factors may be configured at a user interface, such as user interface 300. The factors may include an identifier, a sequence key (also referred to as a code), a date, a time, an end time, a start time, one or more parameters, an expression, and/or any other semantic association with the business objects that might be carried by the XML messages. For example, a key, such as the sequence key, may be formed based on one or more attributes obtained from business object 194 and/or 196 via a query of the business objects 194 and/or 196. The attributes may include fields, such as a purchase order number, a customer identifier, and/or other fields in the business object, and these fields may be concatenated to for the key which can be used to select XML messages 198 based on a business semantic defined by the key. Moreover, the user interface 300 may be used to obtain and then define the one or more attributes forming the sequence key. In some implementations, the XML evaluator 192 may also access metadata at the business objects, and this metadata may define where to look in the XML messages 198 for the sequence key (or other factor being searched for in the XML messages).

At 620, the XML message evaluator 192 may select one or more XML messages, when there is a match or a substantial match between the one or more factors and a portion of an XML message. For example, a factor may comprise a sequence key generated as noted at 610. In this example, the XML evaluator 192 may search for XML messages 198 containing the sequence key. The XML message evaluator 192 may then select XML messages containing exact matches, such as an identical value for the sequence key, or may select XML messages containing partial matches, such as a portion of the sequence key, using a fuzzy search. In some implementations, the results may include other factors, such as for a date, a time, an evaluation expression, and/or other factors, to identify messages containing these factors. As the results include attributes from the business objects themselves, the search for selected messages takes in to account the business semantics of the business objects (which may in some instances enhance the selection of the appropriate XML messages of interest).

At 630, the selected at least one XML message may be presented as a result. For example, the XML messages may be presented as results 400 as described with respect to FIG. 4.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively, or additionally, store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A non-transitory computer-readable storage medium storing one or more programs, the one or more programs having instructions which when executed by at least one programmable processor, cause the at least one programmable processor to perform operations comprising:

configuring, at a message evaluator, one or more factors to enable a selection of one or more messages from a plurality of messages exchanged between a sending object and a receiving object, wherein the plurality of messages are sent by the sending object in a certain sequence, wherein the receiving object receives at least one of the plurality of messages out of sequence, wherein the one or more factors are adapted to enable the one or more messages to be selected in sequence in which the plurality of messages are sent by the sending object, wherein the one or more factors includes a context key generated by concatenating a plurality of attributes obtained by at least accessing one or more data fields in at least one of the sending object or the receiving object, wherein the plurality of attributes are obtained by at least querying the one or more data fields of the at least one of the sending object or the receiving object, wherein the one or more factors further include a unique transaction document identifier that is mapped to a root node identifier of the sending object or the receiving object, wherein the unique transaction document identifier indicates a semantic of a content of the plurality of messages exchanged between the sending object and the receiving object, and wherein the sending object comprises a source of the plurality of messages and the receiving object comprises a destination of the plurality of messages;

selecting, by the message evaluator, a message of the plurality of messages, wherein the selecting includes performing a fuzzy search, when the unique transaction document identifier cannot be mapped to the root node of the sending object or the receiving object, wherein the performing of the fuzzy search identifies the message when a match or a substantial match exists between the message and a date, a time, and the context key; and presenting, by the message evaluator, the selected message.

2. The non-transitory computer-readable storage medium of claim 1, wherein the plurality of messages comprise messages configured in accordance with an extensible mark-up language.

3. The non-transitory computer-readable storage medium of claim 1, wherein the accessed at least one of the sending object or the receiving object comprise a business object including a root node linked to the plurality of attributes comprising the data fields.

4. The non-transitory computer-readable storage medium of claim 1, wherein the one or more factors further comprise an evaluation expression, a message status, and an identifier representative of at least one of a transaction or a document associated with at least one of the sending object or the receiving object.

5. The non-transitory computer-readable storage medium of claim 1, further comprising:
receiving, from a user interface, the one or more factors selected via the user interface.

6. A method comprising:
configuring, at a message evaluator, one or more factors to enable a selection of one or more messages from a plurality of messages exchanged between a sending object and a receiving object, wherein the plurality of messages are sent by the sending object in a certain sequence, wherein the receiving object receives at least one of the plurality of messages out of sequence, wherein the one or more factors are adapted to enable the one or more messages to be selected in sequence in which the plurality of messages are sent by the sending object, wherein the one or more factors includes a context key generated by concatenating a plurality of attributes obtained by at least accessing one or more data fields in at least one of the sending object or the receiving object, wherein the plurality of attributes are obtained by at least querying the one or more data fields of the at least one of the sending object or the receiving object, wherein the one or more factors further include a unique transaction document identifier that is mapped to a root node identifier of the sending object or the receiving object, wherein the unique transaction document identifier indicates a semantic of a content of the plurality of messages exchanged between the sending object and the receiving object, and wherein the sending object comprises a source of the plurality of messages and the receiving object comprises a destination of the plurality of messages;
selecting, by the message evaluator, a message of the plurality of messages, wherein the selecting includes performing a fuzzy search, when the unique transaction document identifier cannot be mapped to the root node of the sending object or the receiving object, wherein the performing of the fuzzy search identifies the message when a match or a substantial match exists between the message and a date, a time, and the context key; and
presenting, by the message evaluator, the selected message.

7. The method of claim 6, wherein the plurality of messages comprise messages configured in accordance with an extensible mark-up language.

8. The method of claim 6, wherein the accessed at least one of the sending object or the receiving object comprise a business object including a root node linked to the plurality of attributes comprising the data fields.

9. The method of claim 6, wherein the one or more factors further comprise an evaluation expression, a message status, and an identifier representative of at least one of a transaction or a document associated with at least one of the sending object or the receiving object.

10. The method of claim 6, further comprising:
receiving, from a user interface, the one or more factors selected via the user interface.

11. A system comprising:
at least one processor; and
at least one memory including one or more programs, which when executed by the at least one processor causes operations comprising:
configuring, at a message evaluator, one or more factors to enable a selection of one or more messages from a plurality of messages exchanged between a sending object and a receiving object, wherein the plurality of messages are sent by the sending object in a certain sequence, wherein the receiving object receives at least one of the plurality of messages out of sequence, wherein the one or more factors are adapted to enable the one or more messages to be selected in sequence in which the plurality of messages are sent by the sending object, wherein the one or more factors includes a context key generated by concatenating a plurality of attributes obtained by at least accessing one or more data fields in at least one of the sending object or the receiving object, wherein the plurality of attributes are obtained by at least querying the one or more data fields of the at least one of the sending object or the receiving object, wherein the one or more factors further include a unique transaction document identifier that is mapped to a root node identifier of the sending object or the receiving object, wherein the unique transaction document identifier indicates a semantic of a content of the plurality of messages exchanged between the sending object and the receiving object, and wherein the sending object comprises a source of the plurality of messages and the receiving object comprises a destination of the plurality of messages;
selecting, by the message evaluator, a message of the plurality of messages, wherein the selecting includes performing a fuzzy search, when the unique transaction document identifier cannot be mapped to the root node of the sending object or the receiving object, wherein the performing of the fuzzy search identifies the message when a match or a substantial match exists between the message and a date, a time, and the context key; and
presenting, by the message evaluator, the selected message.

12. The system of claim 11, wherein the plurality of messages comprise messages configured in accordance with an extensible mark-up language.

13. The system of claim 11, wherein the accessed at least one of the sending object or the receiving object comprise a business object including a root node linked to the plurality of attributes comprising the data fields.

14. The system of claim 11, wherein the one or more factors further comprise an evaluation expression, a message status, and an identifier representative of at least one of a transaction or a document associated with at least one of the sending object or the receiving object.

15. The non-transitory computer-readable storage medium of claim 1, wherein the presenting further comprises identifying one or more inconsistencies between messages of the plurality of messages exchanged between the sending object and the receiving object.

16. The method of claim 6, wherein the presenting further comprises identifying one or more inconsistencies between messages of the plurality of messages exchanged between the sending object and the receiving object.

17. The system of claim 11, wherein the presenting further comprises identifying one or more inconsistencies between messages of the plurality of messages exchanged between the sending object and the receiving object.

18. The non-transitory computer-readable storage medium of claim 1, wherein the selected message comprises a part of the message of the plurality of messages exchanged between the sending object and the receiving object.

19. The method of claim 6, wherein the selected message comprises a part of the message of the plurality of messages exchanged between the sending object and the receiving object.

20. The system of claim 11, wherein the selected message comprises a part of the message of the plurality of messages exchanged between the sending object and the receiving object.

* * * * *